US010222535B2

(12) United States Patent
Remhof et al.

(10) Patent No.: US 10,222,535 B2
(45) Date of Patent: Mar. 5, 2019

(54) FLAT LIGHT GUIDE

(71) Applicant: 3M INNOVATIVE PROPERTIES COMPANY, St. Paul, MN (US)

(72) Inventors: Tilo Remhof, Hilden (DE); Nicholas T. Gabriel, Woodbury, MN (US); Andrew J. Ouderkirk, St. Paul, MN (US)

(73) Assignee: 3M Innovative Properties Company, St.Paul, MN (US)

( * ) Notice: Subject to any disclaimer, the term of this patent is extended or adjusted under 35 U.S.C. 154(b) by 541 days.

(21) Appl. No.: 14/899,994

(22) PCT Filed: Jun. 26, 2014

(86) PCT No.: PCT/US2014/044278
§ 371 (c)(1),
(2) Date: Dec. 18, 2015

(87) PCT Pub. No.: WO2015/002800
PCT Pub. Date: Jan. 8, 2015

(65) Prior Publication Data
US 2016/0139323 A1 May 19, 2016

Related U.S. Application Data

(60) Provisional application No. 61/842,032, filed on Jul. 2, 2013.

(51) Int. Cl.
*F21V 8/00* (2006.01)
(52) U.S. Cl.
CPC ......... *G02B 6/0048* (2013.01); *G02B 6/0018* (2013.01); *G02B 6/0028* (2013.01); *G02B 6/0078* (2013.01)

(58) Field of Classification Search
CPC .. G02B 6/0048; G02B 6/0018; G02B 6/0028; G02B 6/0078
See application file for complete search history.

(56) References Cited

U.S. PATENT DOCUMENTS

| 6,146,006 | A | 11/2000 | Cross | |
| 6,792,213 | B1 * | 9/2004 | Okada | G02B 6/12002 385/146 |
| 7,548,670 | B2 * | 6/2009 | Ijzerman | G02B 6/0048 359/443 |
| 7,903,338 | B1 | 3/2011 | Wach | |
| 8,379,172 | B2 * | 2/2013 | Nagata | G02B 6/005 349/106 |

(Continued)

FOREIGN PATENT DOCUMENTS

| CN | 101886785 | 11/2010 |
| CN | 202361187 | 8/2012 |

(Continued)

*Primary Examiner* — Robert J May
*Assistant Examiner* — Leah S Macchiarolo
(74) *Attorney, Agent, or Firm* — Michael Stern

(57) ABSTRACT

The present disclosure describes a flat lightguide configured to be illuminated by one or more small light sources, such as light emitting diode (LED) light sources. The one or more small light sources inject light into an end of a stepped lightguide that includes light redirecting elements capable of changing the direction of the light to exit perpendicular to the stepped lightguide and enter an edge of a planar lightguide.

6 Claims, 5 Drawing Sheets

(56) References Cited

U.S. PATENT DOCUMENTS

| | | |
|---|---|---|
| 8,393,777 B2 | 3/2013 | Minano |
| 8,810,911 B2 | 8/2014 | Hwang |
| 9,036,964 B2 | 5/2015 | Ouderkirk |
| 9,039,905 B2 | 5/2015 | Ouderkirk |
| 9,817,173 B2 * | 11/2017 | Ouderkirk ............ G02B 6/0028 |
| 2002/0145593 A1 | 10/2002 | Boyd |
| 2004/0141308 A1 | 7/2004 | Saccomanno |
| 2005/0063172 A1 | 3/2005 | Torihara |
| 2005/0162867 A1 | 7/2005 | Sinofsky |
| 2006/0001037 A1 | 1/2006 | Schardt |
| 2007/0127262 A1 | 6/2007 | Schultz |
| 2007/0195549 A1 | 8/2007 | Schardt |
| 2009/0086466 A1 | 4/2009 | Sugita |
| 2009/0154198 A1 | 6/2009 | Lee |
| 2009/0316431 A1 | 12/2009 | Nagata |
| 2009/0323144 A1 | 12/2009 | Gruhlke |
| 2010/0165450 A1 | 7/2010 | Okuyama |
| 2011/0227487 A1 | 9/2011 | Nichol |
| 2012/0147627 A1 | 6/2012 | Pan |
| 2013/0216182 A1 * | 8/2013 | Ouderkirk ................ G02B 6/26 385/31 |

FOREIGN PATENT DOCUMENTS

| | | |
|---|---|---|
| DE | 202012100806 | 5/2012 |
| GB | 2468411 | 9/2010 |
| JP | 2004-199967 | 7/2004 |
| JP | 2004-246228 | 9/2004 |
| JP | 2006-236771 | 9/2006 |
| JP | 2006-323316 | 11/2006 |
| JP | 2009-103892 | 5/2009 |
| JP | 2010-266825 | 11/2010 |
| JP | 2011-154078 | 8/2011 |
| JP | 2012-084477 | 4/2012 |
| JP | 2012-156082 | 8/2012 |
| KR | 2007-079689 | 8/2007 |
| KR | 2008-057595 | 6/2008 |
| WO | WO 1998-22749 | 5/1998 |
| WO | WO 2001-95027 | 12/2001 |
| WO | WO 2003-048635 | 6/2003 |
| WO | WO 2003-081320 | 10/2003 |
| WO | WO 2008-045200 | 4/2008 |
| WO | WO 2010-004745 | 1/2010 |
| WO | WO 2010-100784 | 9/2010 |
| WO | WO 2010-120845 | 10/2010 |
| WO | WO 2011-050226 | 4/2011 |
| WO | WO 2011-050233 | 4/2011 |
| WO | WO 2011-050268 | 4/2011 |
| WO | WO 2011-065052 | 6/2011 |
| WO | WO 2011-071728 | 6/2011 |
| WO | WO 2011-087958 | 7/2011 |
| WO | WO 2011-100277 | 8/2011 |
| WO | WO 2011-129848 | 10/2011 |
| WO | WO 2012-064519 | 5/2012 |
| WO | WO 2012-116129 | 8/2012 |
| WO | WO 2012-116199 | 8/2012 |
| WO | WO 2012-116215 | 8/2012 |
| WO | WO 2012-146960 | 11/2012 |
| WO | WO 2012-158414 | 11/2012 |
| WO | WO 2013-122730 | 8/2013 |

* cited by examiner

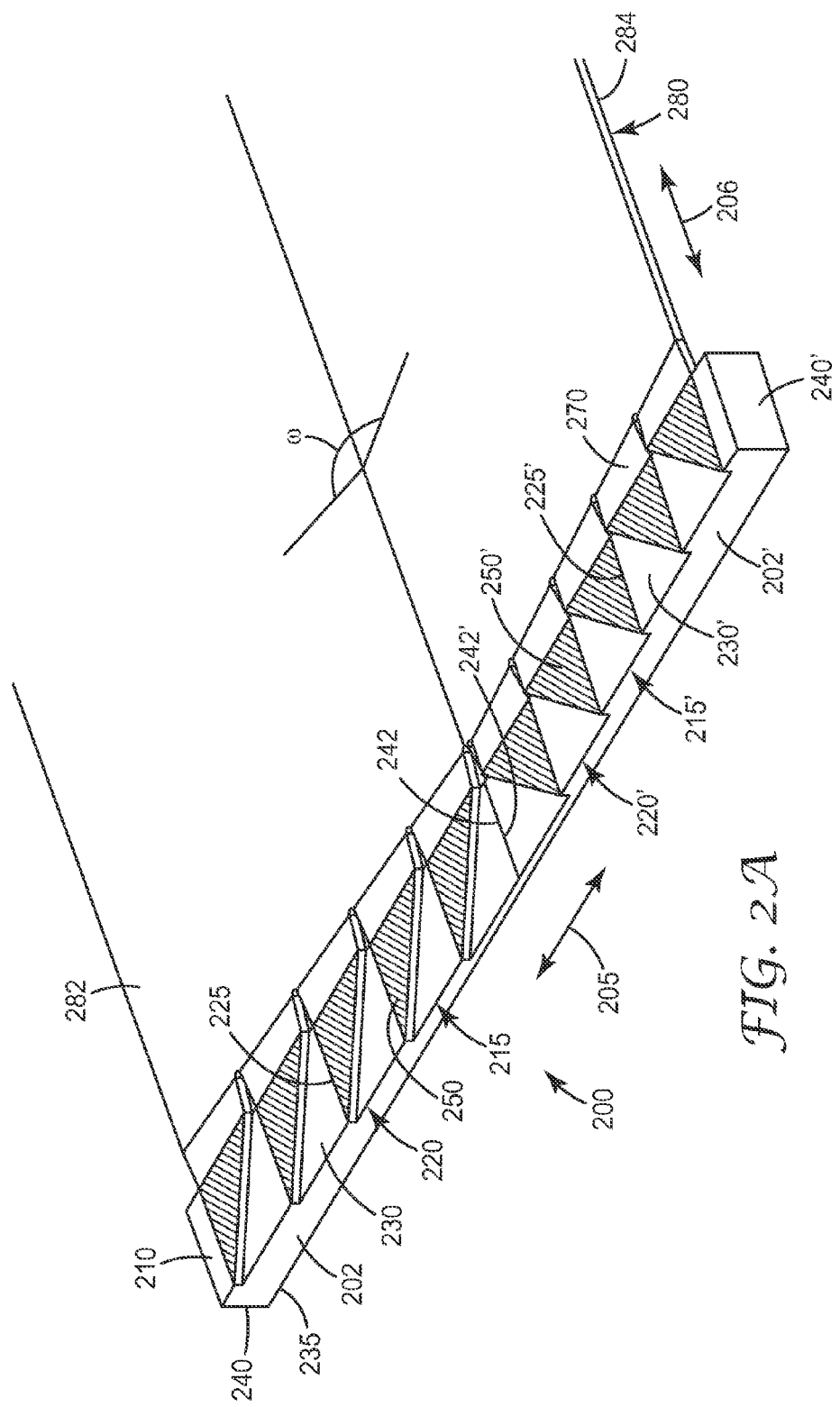

FLAT LIGHT GUIDE

CROSS REFERENCE TO RELATED APPLICATIONS

This application is a national stage filing under 35 U.S.C. 371 of PCT/US2014/044278, filed Jun. 26, 2014, which claims priority to U.S. Provisional Application No. 61/842,032, filed Jul. 2, 2013, the disclosure of which is incorporated by reference in its/their entirety herein.

BACKGROUND

Spatial light modulators, including particularly liquid crystal displays (LCDs), often use a backlight or a frontlight to provide light for the display. A common light source for these lights are light emitting diodes (LEDs), with the LEDs either being directly underneath the LCD (so-called direct lit) or illuminating the edge of a waveguide disposed below the LCD (so-called edge lit), or a combination of the two. An example of a combination is where the backlight is made of an array of LEDs illuminating a waveguide, where the waveguides are tiled to form a backlight.

Optical waveguides can be either flat sheets or can be tapered, and may have edges that are coated with a reflective material, such as a metallic tape. The waveguides are commonly manufactured by molding or casting of resin into the near-final or final shape, or are fabricated from a larger sheet.

SUMMARY

The present disclosure describes a flat lightguide configured to be illuminated by one or more small light sources, such as light emitting diode (LED) light sources. The one or more small light sources inject light into an end of a stepped lightguide that includes light redirecting elements capable of changing the direction of the light to exit perpendicular to the stepped lightguide and enter an edge of a planar lightguide. In one aspect, the present disclosure provides a lightguide that includes a first lightguide layer extending along a first length of the lightguide along a first direction and a second lightguide layer extending along a second length of the lightguide along a different second direction. The first lightguide layer includes a first top surface comprising a first staircase extending along the first direction and having a plurality of first steps forming alternating first risers and first treads; an opposite first bottom surface; and a first light input side extending between the first top and bottom surfaces, the first lightguide layer being configured to receive light from the first light input side. The second lightguide layer extending along a second length of the lightguide along a different second direction and including a second top surface; an opposite second bottom surface; and a second light input side extending between the second top and bottom surfaces and having a row of first light redirecting elements disposed along the second light input side, each first light redirecting element being disposed on a different corresponding first tread and optically coupled to a different corresponding first riser, the first light redirecting element being configured to redirect light exiting the corresponding first riser.

In another aspect, the present disclosure provides the lightguide as described above, wherein each first light redirecting element includes a first light redirecting input side adjacent and optically coupled to the first riser corresponding to the light redirecting element; and a first light redirecting side making an oblique angle with the first light redirecting input side and configured to redirect light exiting the corresponding first riser and entering the first light redirecting element from the first light input side, the redirected light propagating within the second lightguide layer along the second direction and exiting the lightguide from the second top surface.

In yet another aspect, the present disclosure provides the lightguide as described above, wherein each first light redirecting element includes a bottom face disposed on the corresponding first tread, an input face extending upwardly from the bottom face and optically coupled to the corresponding first riser, and a light redirecting face opposite the input face and extending upwardly from the bottom face, the light redirecting face being configured to redirect light exiting the corresponding first riser and entering the first light redirecting element through the input face.

In yet another aspect, the present disclosure provides the lightguide described above, wherein: the first top surface of the first lightguide layer further includes a second staircase extending along the first direction and having a plurality of second steps forming alternating second risers and second treads; the first lightguide layer further includes a second light input side opposite the first light input side and extending between the first top and bottom surfaces, the first lightguide layer being configured to receive light from the second light input side, the received light propagating within the first lightguide layer along the first direction and exiting the first lightguide layer from the second risers; and the second lightguide layer further having a row of second light redirecting elements disposed along the second light input side, each second light redirecting element being disposed on a different corresponding second tread and optically coupled to a different corresponding second riser, the second light redirecting element being configured to redirect light exiting the corresponding second riser, the redirected light propagating within the second lightguide layer along the second direction and exiting the lightguide from the second top surface.

In yet another aspect, the present disclosure provides the lightguide as described above, wherein each second light redirecting element includes a second light input side adjacent and optically coupled to the second riser corresponding to the light redirecting element; and second light redirecting side making an oblique angle with the second light input side and configured to redirect light exiting the corresponding second riser and entering the second light redirecting element from the second light input side, the redirected light propagating within the second lightguide layer along the second direction and exiting the lightguide from the second top surface.

In yet another aspect, the present disclosure provides the lightguide as described above, wherein each second light redirecting element includes a bottom face disposed on the corresponding second tread, an input face extending upwardly from the bottom face and optically coupled to the corresponding second riser, and a light redirecting face opposite the input face and extending upwardly from the bottom face, the light redirecting face being configured to redirect light exiting the corresponding second riser and entering the second light redirecting element through the input face.

In yet another aspect, the present disclosure provides a lightguide that includes a first unitary lightguide layer and a second unitary lightguide layer. The first unitary lightguide layer includes opposing first and second sides and a staircase extending from the first side toward the second side, the staircase comprising alternating risers and treads. The second unitary lightguide layer including opposing first and second sides and a plurality of light redirecting elements disposed along the first side of the second unitary lightguide layer, each light redirecting element being optically coupled to a different corresponding riser, such that light that enters the first unitary lightguide layer from the first side of the first unitary lightguide layer travels within the first unitary lightguide layer toward the second side of the first unitary lightguide layer, exits the first unitary lightguide layer from the riser, is redirected by the light redirecting element, and the redirected light travels within the second unitary lightguide layer toward the second side of the second unitary lightguide layer, and exits the lightguide from an emission side of the second unitary lightguide layer.

In yet another aspect, the present disclosure provides a lightguide that includes a first elongated lightguide layer extending along a first length of the lightguide along a first direction, a planar second lightguide layer extending along a second length of the lightguide along a different second direction, and a coupler. The first elongated lightguide layer includes a first light input side; and a first top surface having a first staircase descending away from the first light input side along the first direction and comprising a plurality of first steps forming alternating first risers and first treads, the first elongated lightguide layer being configured to receive light from the first light input side, the received light propagating within the first elongated lightguide layer along the first direction and exiting the first elongated lightguide layer from the first risers. The planar second lightguide layer includes a second top surface and a second light input side. The coupler includes a row of first light redirecting elements, each first light redirecting element being disposed on a different corresponding first tread, optically coupled to a different corresponding first riser and optically coupled to the second light input side, the first light redirecting element being configured to redirect light exiting the corresponding first riser, the redirected light entering the planar second lightguide layer through the second light input side and propagating within the planar second lightguide layer along the second direction and exiting the lightguide from the second top surface.

In yet another aspect, the present disclosure provides a lightguide as described above, wherein each first light redirecting element includes a first light redirecting input side adjacent and optically coupled to the first riser corresponding to the light redirecting element; and a first light redirecting side making an oblique angle with the first light redirecting input side and configured to redirect light exiting the corresponding first riser and entering the first light redirecting element from the first light redirecting input side, the redirected light propagating within the planar second lightguide layer along the second direction and exiting the lightguide from the second top surface.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 2A shows a perspective view of a lightguide.

The figures are not necessarily to scale Like numbers used in the figures refer to like components. However, it will be understood that the use of a number to refer to a component in a given figure is not intended to limit the component in another figure labeled with the same number.

DETAILED DESCRIPTION

Figure 1A:
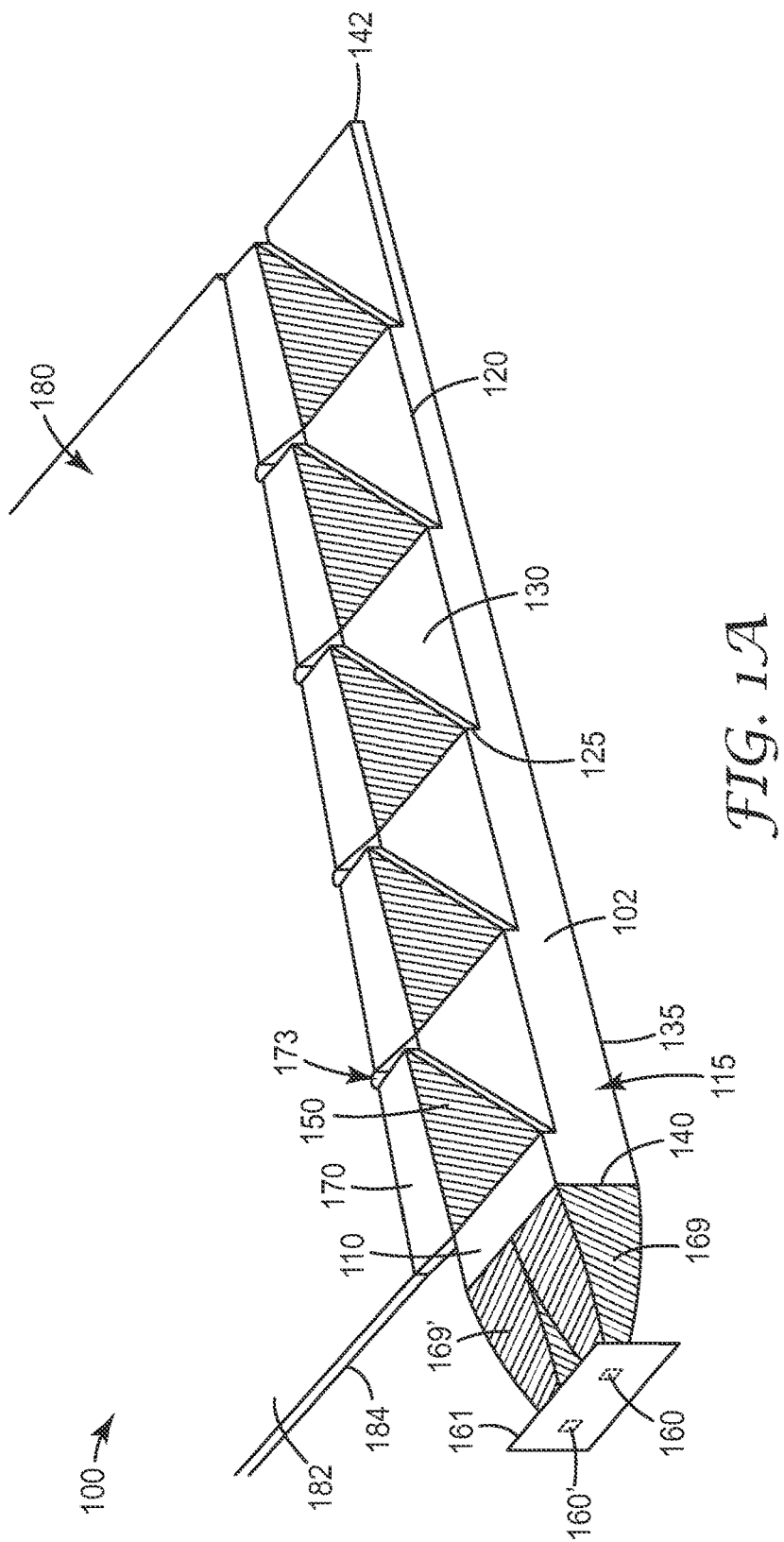
FIG. 1A shows a perspective view of a lightguide.

The present disclosure describes a light distribution device for a backlight or frontlight, useful in, for example, a spatial light modulator display such as a liquid crystal display (LCD). The light distribution device can generally be described as an illumination converter that accepts an input light from one or more sources, such as one or more point sources or other small cross-sectional area source(s), and converts the light to a plurality of line sources that can be used, for example, to illuminate the edge of a waveguide.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

In one particular embodiment, the flat lightguide can include at least one light emitting diode (LED), collection and/or collimation optics for light emitted by the LED, and a transparent lightguide layer having a staircase having a plurality of stair-steps that are capable of re-directing light from the transparent lightguide layer to a flat lightguide layer. In one particular embodiment, the light redirecting element input and output edges form a right angle, and the redirecting element includes a reflective edge at a 45 degree angle with respect to the input and output edges. In some cases, the output edge is positioned to inject light into a coupler that joins the output edge of the light redirecting element to an input edge of the flat lightguide layer.

In one particular embodiment, it may be desirable to form the transparent lightguide layer such that multiple light sources can be positioned along the light input side. In some cases, the multiple light sources can emit the same color of light, such that the intensity of the light input into the transparent lightguide layer is the sum of the intensities of each of the individual light sources. In some cases, aligning LEDs in such a manner can be advantageous for the efficiency, longevity, color balance, and/or thermal management of the light sources. In some cases, the multiple light sources can emit different colors of light, such that the light input into the transparent lightguide layer can be controlled by blending different colors, different intensities, and/or time sequencing of the colored light input can be performed, such as to coincide with different output colors of a display. Each of the multiple light sources can be associated with collection and/or collimation optics that can serve to focus or collimate the light for input into the input side. In one particular embodiment, more than one transparent lightguide layer can be positioned on one edge of the flat lightguide layer, and in some cases, each of the staircases can be positioned adjacent each other with the staircases ascending and then descending along the flat lightguide edge. In some cases, the transparent lightguide layers can also be positioned on more than one edge of the flat lightguide, if desired.

Edge lighting can have advantages over direct lighting, due to the waveguide being thinner while at the same time achieving a uniformly illuminated display. Edge illumination has several challenges, however. The aspect ratio (e.g., width to thickness) of the edge of the waveguide is usually very high, often exceeding 10:1 or even over 100:1, while typical LEDs have an aspect ratio close to one. This can create several problems when attempting to couple the LED to the edge of the waveguide to sufficiently illuminate the display. In some cases, typically only a small number of LEDs are used to illuminate one or more edges of the waveguide, and this can create non-uniformity in the LCD illumination across the surface of the waveguide. In some cases, the etendue of the optical system can increase, with a resulting increase in the thickness required for the waveguide. This can result in a potential reduction in the recycling system efficiency of the backlight using different gain films.

In some cases, the LED edge-lit displays use one of a number of approaches to generate white light. One such approach is to add a phosphor to an ultraviolet (UV) or blue LED to produce white light by downconverting the emitted radiation. The phosphor typically increases the etendue of small LEDs to a greater extent than with large LEDs. Another approach to generate white light is to combine red, green, and blue light emitting LEDs. Conventional edge-lit waveguides can make it very difficult to use such color combining optical systems to reduce etendue.

The present disclosure provides an etendue match between a light source and a backlight waveguide by using a lightguide layer that includes light redirecting elements disposed on a staircase descending from the light input side along the length of the lightguide layer. Each of the light redirecting elements can inject a portion of the input light into the edge of the flat lightguide layer. The described flat lightguide increases the optical efficiency in backlights using recycling films, reduces backlight thickness, and reduces materials cost and consumption. In this embodiment, the illumination converter transforms the typically low aspect ratio output of light collected from a plurality of LEDs, and converts it into a linear light source that can be suitable for use in an edge-lit display.

FIG. 1A shows a perspective view of a lightguide 100 according to one aspect of the disclosure. Lightguide 100 includes a first lightguide layer 102 that includes a top surface 110, an opposing bottom surface 135, a light input side 140, an opposing end side 142, and a staircase 115. The staircase 115 includes a plurality of steps 120 that have treads 130 and risers 125 that extend along the top surface 110 from the light input side 140 to the opposing end side 142. At least one light source 160 can be mounted to a heat sink 161 and positioned to inject light through at least one light collimator 169 into the light input side 140 of the first lightguide layer 102. In some cases, additional light source 160' can also be mounted to the heat sink 161 and positioned to inject light through additional collimator 169' into the light input side 140 of the first lightguide layer 102. Any desired number of light sources can be positioned to inject light into the light input side 140, and the light sources can be the same or different, and can also pass through different light collimators or through the same collimator, if desired.

Lightguide 100 further includes a second lightguide layer 180 having a top surface 182 and an opposing bottom surface 184. Second lightguide layer 180 can be a planar lightguide, a tapered lightguide, a curved lightguide, and the like. A plurality of light redirecting elements 150 are positioned to accept light from each of the risers 125 of the first lightguide layer 102, and redirect light into light couplers 170 that serve as a junction between first lightguide layer 102 and second lightguide layer 180, as described elsewhere.

The first lightguide layer 102; second lightguide layer 180; collimators 169, 169'; light redirecting elements 150; and light couplers 170 can be made from the same or different materials. In one particular embodiment, the material can be a highly transparent polymer or glass film, sheet, or block, preferably having less than about 6 dB/m loss for light having a wavelength of between 450 and 650 nm. In some cases, loss can result from effects such as volume or surface scattering and absorption. Suitable polymeric materials include acrylates, especially polystyrene, polymethylmethacrylate, silicones, polyesters, polyolefins, polycarbonates, polyurethanes, and the like. The polymer film, sheet, and block, may be made by any suitable technique including, for example, molding, extrusion, cast and cure, or solvent coating.

Suitable glass materials include those based on inorganic oxides, particularly amorphous inorganic oxides. Preferred are glasses based on silicon dioxide, especially glasses based on mixtures of silicon dioxide with one or more of the following: oxides of aluminum, magnesium, calcium, lithium, sodium, potassium, iron, chromium, manganese, cobalt, titanium, sulfur, barium, strontium, lead, zirconium, and elements including fluorine and selenium. Especially preferred are borosilicate glasses such as N-BK7 made by Schott glass. In some cases, the glass can be made as a thin film with very smooth surfaces using suitable drawing processes known in the art, such as those used for making glass films for the Liquid Crystal Display (LCD) industry. The term "film" or "sheet" is used interchangeably herein for describing polymer and glass forms, and includes materials with a thickness between about 10 and 2000 microns.

The collimators 169, 169', can be any suitable light collimator that can be used to reduce the collimation half-angle of the light entering the light input side 140. Typical light collimators include tapered tunnels or other non-imaging optical elements such as compound parabolic concentrator (CPC) designs, as known to one of skill in the art. The collimators can be hollow or solid, and can include a reflective surface or can instead use total internal reflection (TIR) to steer the light.

Each of the edges of the films, sheets, slabs, and other elements described herein have a thickness "t", where "t" is much smaller than any other dimension in the flat lightguide, which leads to a high-aspect ratio (i.e., either width or length divided by thickness) waveguide. The other dimensions can each be up to 10 times greater, up to 100 times greater, or even more than 100 times greater than the thickness "t" of the edges of the film or sheet elements.

Figure 1B:
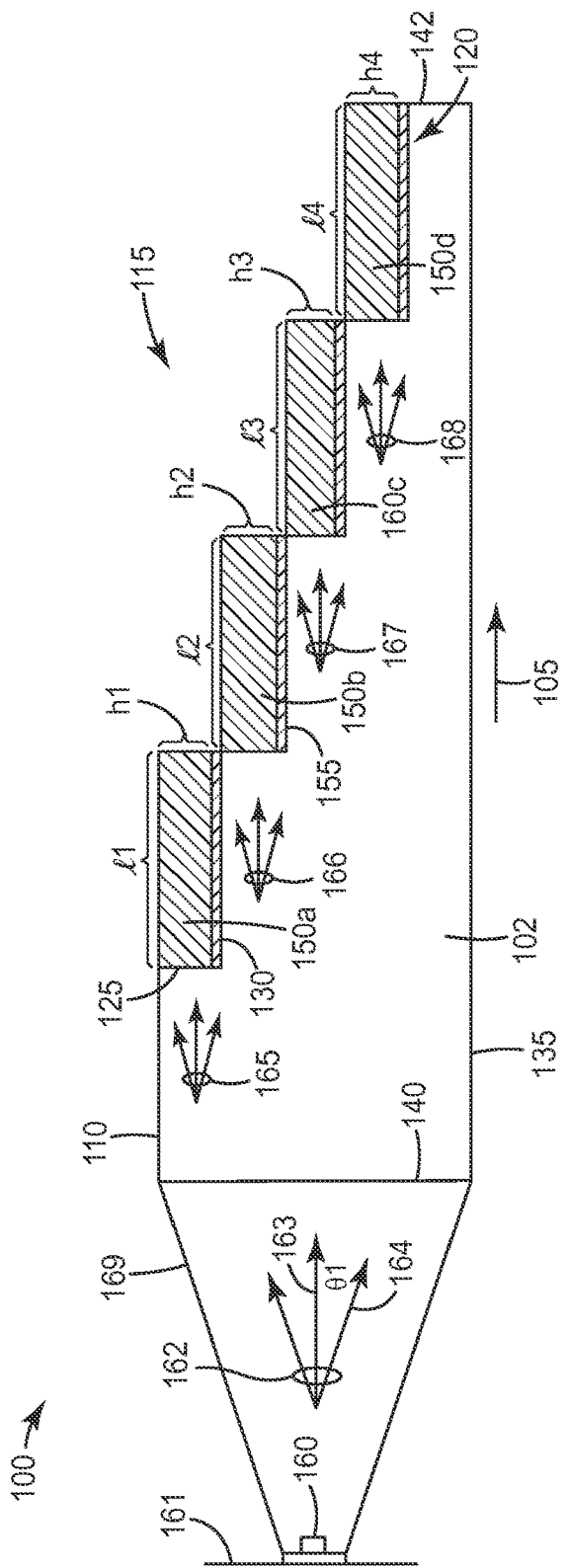
FIG. 1B shows a schematic side view of a lightguide.

FIG. 1B shows a schematic side view of a lightguide 100, according to one aspect of the disclosure. Each of the elements 102-180 shown in FIG. 1B correspond to like-numbered elements 102-180 shown in FIG. 1A, which have been described previously. For example, light source 160 shown in FIG. 1B corresponds to light source 160 shown in FIG. 1A, and so on. Lightguide 100 includes a first lightguide layer 102 that includes a top surface 110, an opposing bottom surface 135, a light input side 140, an opposing end side 142, and a staircase 115. The staircase 115 includes a plurality of steps 120 that have treads 130 and risers 125 that extend along the top surface 110 from the light input side 140 to the opposing end side 142. The risers 125 and treads 130 can independently be planar or curved surfaces, and can meet at any desired angle to each other; however, planar surfaces meeting perpendicular to each other can be preferred.

Each of the surfaces of the first lightguide layer 102, including the top surface 110, opposing bottom surface 135, light input side 140, treads 130 and risers 125 can be smooth polished surfaces such that total internal reflection (TIR) can occur at each of the surfaces. At least one light source 160 can be mounted to a heat sink 161 and positioned to inject light through a light collimator 169 and into the light input side 140 of the first lightguide layer 102 as a partially collimated input light beam 162. In some cases, additional light sources (not shown) can also be positioned to inject light into the light input side 140 of the first lightguide layer 102, as described elsewhere.

Each partially collimated input light beam 162 includes a collimation half-angle $\theta 1$. In some cases, the collimation half-angle $\theta 1$ can range up to about 45 degrees, up to about 40 degrees, up to about 30 degrees, up to about 20 degrees, or up to about 15 degrees, depending on the configuration of the light source, as known to one of skill in the art. Preferably, the collimation half-angle $\theta 1$ can range from about 5 degrees to about 20 degrees.

In one particular embodiment, each partially collimated input light beam 162 can originate from two or more different light sources which are combined and mixed, so as to appear uniformly distributed, as described elsewhere. As a result of the partial collimation of the each partially collimated input light beam 162, and the fabrication technique of the flat lightguide 100, several light sources that enter light input side 140 can be combined to pass through to second lightguide layer 180, where further mixing and homogenization can occur.

A light redirecting element 150, such as first through a fourth light redirecting element 150a, 150b, 150c, 150d, is disposed on successive treads 130 of steps 120 of staircase 115 such that an input edge of each of the first through fourth light redirecting element 150a, 150b, 150c, 150d, is in optical contact with each successive riser 125. It is to be understood than any desired number of steps 120 including treads 130 and risers 125 can be disposed on staircase 115, and the four steps 120 shown in FIG. 1B are for illustrative purposed only. Each of the first through fourth light redirecting elements 150a, 150b, 150c, 150d, can have a first through fourth height h1, h2, h3, h4, respectively, that is the same or different for each of the elements, and a first through fourth length L1, L2, L3, L4, respectively, that is also the same or different for each of the elements. Generally, different heights and/or lengths can result in different distributions of light throughout the flat lightguide, as described elsewhere. Also, generally, each of the first through fourth height h1, h2, h3, h4 of the first through fourth light redirecting elements 150a, 150b, 150c, 150d, respectively, can be the same or different than a corresponding height of the associated riser 125. In some cases, the height of the light redirecting elements can be greater than the height of the riser.

A TIR layer 155 may be disposed between each of the first through fourth light redirecting element 150a, 150b, 150c, 150d, to enhance TIR within the light redirecting elements and also from the treads 130 of staircase 115. In one particular embodiment, the TIR layer 155 can be an optical adhesive layer having a refractive index that is lower than the refractive index of the first through fourth light redirecting elements 150a, 150b, 150c, 150d, and also lower than the first lightguide layer 102. In some cases, an optical adhesive layer (not shown) can be disposed along the risers 125 to adhere the first through fourth light redirecting elements 150a, 150b, 150c, 150d, and in this case, the TIR layer 155 may be a low-index coating that is disposed on either the treads 130 or the light redirecting elements 150.

Generally, TIR can occur when the index of refraction of the material in which the light is propagating is greater than the index of refraction of material that is in contact with the surfaces. As such, in some cases, a gap such as an air gap is provided adjacent each of the surfaces where TIR is desired. In some cases, the surfaces may be coated on one or more surfaces with a low refractive index coating, including fluorocarbons, silicones, and porous materials such as ultralow index coatings and phase separated polyblock copolymers, to enhance TIR. In some cases, the surfaces may be coated with reflective material, such as metals or dielectric coatings. In some cases, the reflective material can include a metal or metal alloy coating such as silver, aluminum, and the like, and can be either a deposited thin film (e.g., by sputtering or vapor deposition) or laminated such as a metal foil or mirror film; or the reflective coating can include a dielectric coating such as a multilayer dielectric coating including alternating inorganic or organic dielectric layers, either deposited or laminated, as known in the art. The lightguide may have other coatings on one or more surfaces, including hard coats, planarization coatings, and antistatic coatings.

Partially collimated input light beam 162 includes a central light ray 163 and boundary light ray 164 within a collimation half-angle θ1 of central light ray 163. As the partially collimated input light beam 162 travels through first lightguide layer 102 along the first direction 105, portions of the partially collimated input light beam 162 intercept the risers 125 of steps 120 of staircase 115, and are injected into various light redirecting elements. For example, first through fourth redirected light beams 165, 166, 167, 168, each having the same collimation half-angle θ1 as partially collimated input light beam 162, enter the first through fourth light redirecting elements 150a, 150b, 150c, 150d, respectively.

Figure 1C:
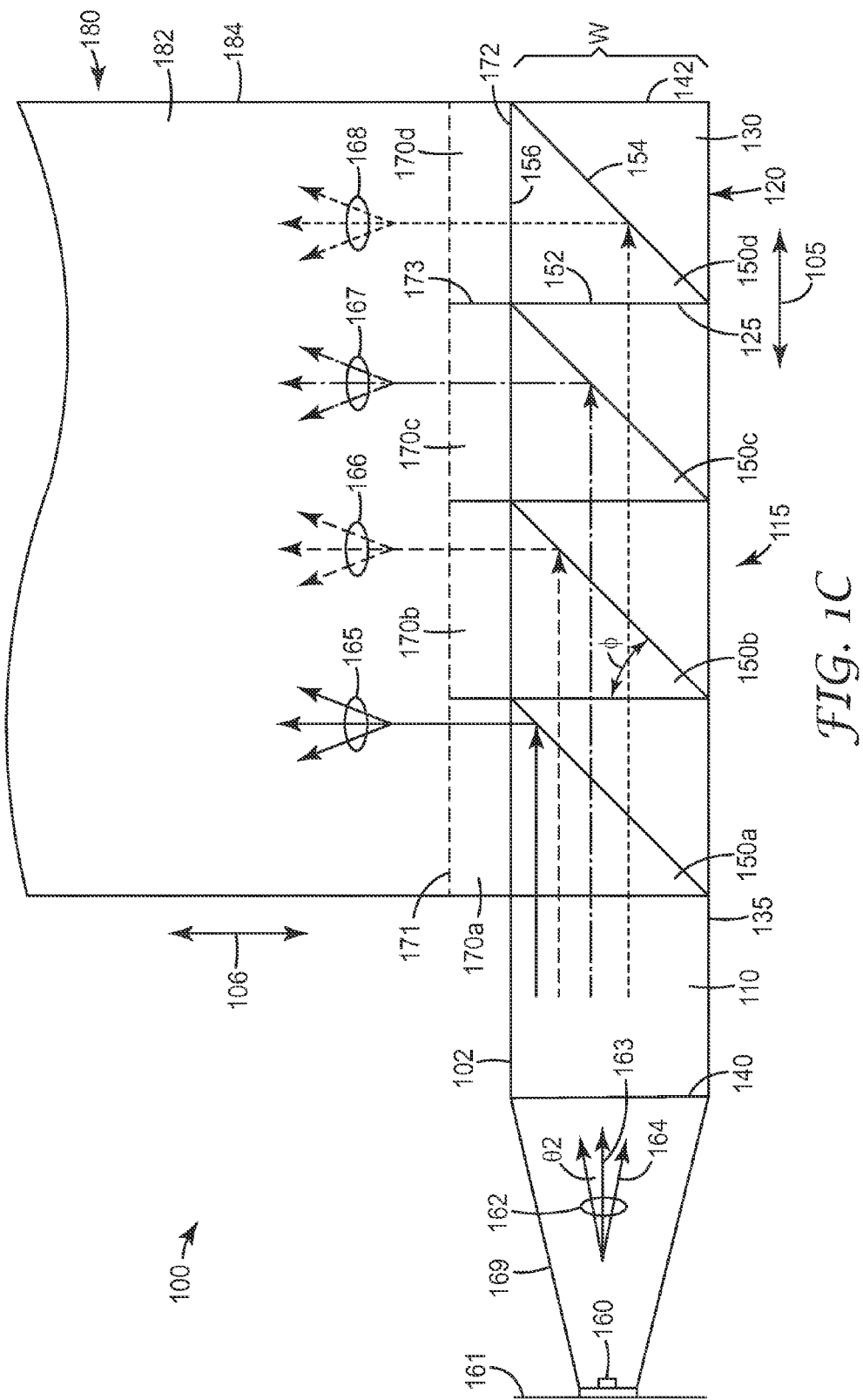
FIG. 1C shows a schematic top view of a lightguide.

FIG. 1C shows a schematic top view of a lightguide 100, according to one aspect of the disclosure. Each of the elements 102-184 shown in FIG. 1C correspond to like-numbered elements 102-184 shown in FIG. 1A, which have been described previously. For example, light source 160 shown in FIG. 1C corresponds to light source 160 shown in FIG. 1A, and so on. Lightguide 100 includes a first lightguide layer 102 that includes a top surface 110, an opposing bottom surface 135, a light input side 140, an opposing end side 142, and a staircase 115. The staircase 115 includes a plurality of steps 120 that have treads 130 and risers 125 that extend along the top surface 110 from the light input side 140 to the opposing end side 142. Each of the surfaces of the first lightguide layer 102, including the top surface 110, opposing bottom surface 135, light input side 140, treads 130 and risers 125 can be smooth polished surfaces such that total internal reflection (TIR) can occur at each of the surfaces. At least one light source 160 can be mounted to a heat sink 161 and positioned to inject light through a light collimator 169 and into the light input side 140 of the first lightguide layer 102 as a partially collimated input light beam 162. In some cases, additional light sources (not shown) can also be positioned to inject light into the light input side 140 of the first lightguide layer 102, as described elsewhere.

A light redirecting element 150, such as first through a fourth light redirecting element 150a, 150b, 150c, 150d, is disposed on successive treads 130 of steps 120 of staircase 115 such that an input edge 152 of each of the first through fourth light redirecting element 150a, 150b, 150c, 150d, is in optical contact with each successive riser 125. It is to be understood than any desired number of steps 120 including treads 130 and risers 125 can be disposed on staircase 115, and the four steps 120 shown in FIG. 1C are for illustrative purposed only. Each of the first through fourth light redirecting elements 150a, 150b, 150c, 150d, can have a width "W" that is the same or different for each of the elements. Generally, different widths can result in different distributions of light throughout the flat lightguide, as described elsewhere; however, for clarity only a uniform width "W" is shown.

Each of the first through a fourth light redirecting element 150a, 150b, 150c, 150d include a light redirecting side 154 that makes an oblique angle φ with the respective input edge 152. The oblique angle φ can range from about 20 degrees to about 70 degrees, or from about 30 degrees to about 60 degrees, or from about 40 degrees to about 50 degrees, or can be about 45 degrees. In one particular embodiment, the oblique angle φ is preferable 45 degrees. The light redirecting side 154 is capable of reflecting light incident upon it, and directing the light to an output edge 156 of the light redirecting element 150. The light redirecting side 154 may include a polished surface that is capable of enabling total internal reflection (TIR) within the light redirecting element, or it may include a reflective coating disposed thereon. In some cases, the reflective coating can include a metal or metal alloy coating such as silver, aluminum, and the like, and can be either a deposited thin film (e.g., by sputtering or vapor deposition) or laminated such as a metal foil or mirror film; or the reflective coating can include a dielectric coating such as a multilayer dielectric coating including alternating inorganic or organic dielectric layers, either deposited or laminated, as known in the art.

Lightguide 100 further includes a second lightguide layer 180 having a top surface 182 and an opposing bottom surface 184. Second lightguide layer 180 can be a planar lightguide, a tapered lightguide, a curved lightguide, and the like. A plurality of light couplers 170, for example a first through a fourth light coupler 170a, 170b, 170c, 170d, span the distance between an input edge 171 of the second lightguide layer 180 and the output edge 156 of each of the first through a fourth light redirecting element 150a, 150b, 150c, 150d. Each of the plurality of light couplers 170 include a coupler input edge 172 that can be optically coupled to the output edge 156 of each of the light redirecting elements 150. Each of the plurality of light couplers 170 further include a separation joint 173 from adjacent light couplers 170, such that each of the light couplers 170 can be twisted and/or rotated to optically mate with the adjacent light redirecting element 150. The plurality of light couplers 170 serve as a junction between first lightguide layer 102, and second lightguide layer 180, as described elsewhere. In some cases, each of the light couplers 170 can be integral with the second lightguide layer 180 and form a unitary structure. In some cases, each of the light couplers 170 can be integral with the respective light redirecting element 150, and form a unitary structure. In some cases, each of the light couplers 170 can be integral with both the second lightguide layer 180 and the respective light redirecting element 150, and form a unitary structure.

Partially collimated input light beam 162 includes a central light ray 163 and boundary light ray 164 within a second collimation half-angle θ2 of central light ray 163. As the partially collimated input light beam 162 travels through first lightguide layer 102 along the first direction 105, portions of the partially collimated input light beam 162 intercept the risers 125 of steps 120 of staircase 115, and are injected into various light redirecting elements. For example, first through fourth redirected light beams 165, 166, 167, 168, each having the same collimation half-angle θ1 as partially collimated input light beam 162, enter the first through fourth light redirecting elements 150a, 150b, 150c, 150d, respectively, through the light input side 152, are reflected from the light redirecting side 154, exit through the light output side 156, pass through the respective light coupler 170 and enter second lightguide layer 180 as first through fourth redirected light beams 165, 166, 167, 168, each having the same second collimation half-angle θ2 as partially collimated input light beam 162, and traveling through the second lightguide layer 180 along second direction 106. In some cases, collimation angle θ1 and second collimation half-angle θ2 can be the same, i.e. the partially collimated input light beam 162 is uniformly collimated into a cone of light having a circular cross-section; however, in some cases, the collimation may be different and the cone of light may have an elliptical or other cross-section.

FIG. 2A shows a perspective view of a lightguide 200 according to one aspect of the disclosure. Each of the elements 202-284 shown in FIG. 2A correspond to like-numbered elements 102-184 shown in FIG. 1A, which have been described previously. For example, first lightguide layer 202 shown in FIG. 2A corresponds to first lightguide layer 102 shown in FIG. 1A, and so on. Lightguide 200 includes a first lightguide layer 202 that includes a top surface 210, an opposing bottom surface 235, a light input side 240, an opposing end side 242, and a staircase 215. The staircase 215 includes a plurality of steps 220 that have treads 230 and risers 225 that extend along the top surface 210 from the light input side 240 to the opposing end side 242. At least one light source (not shown) can be positioned to inject light into the light input side 240 of the first lightguide layer 202, as described elsewhere. Lightguide 200 further includes a second first lightguide layer 202' that includes a second top surface 210', a second opposing bottom surface 235', a second light input side 240', a second opposing end side 242', and a second staircase 215'. The second staircase 215' includes a plurality of second steps 220' that have second treads 230' and second risers 225' that extend along the second top surface 210' from the second light input side 240' to the second opposing end side 242'. At least one light source (not shown) can be positioned to inject light into the second light input side 240' of the second first lightguide layer 202', as described elsewhere. The first lightguide layer 202 and second first lightguide layer 202' are positioned such that the opposing end side 242 and the second opposing end side 242' are adjacent each other, and the staircase 215 and second staircase 215' each descends toward each other.

Lightguide 200 further includes a second lightguide layer 280 having a top surface 282 and an opposing bottom surface 284. Second lightguide layer 280 can be a planar lightguide, a tapered lightguide, a curved lightguide, and the like, and can be aligned such that they form a junction angle "ω" between them. A plurality of first and second light redirecting elements 250, 250', are positioned to accept light from each of the risers 225, 225' of the first lightguide layer 202 and second first lightguide layer 202', respectively, and redirect light into light couplers 270 that serve as a junction between first lightguide layer 202 and second lightguide layer 280, and second first lightguide layer 202' and second lightguide layer 280, respectively, as described elsewhere.

Figure 2B:
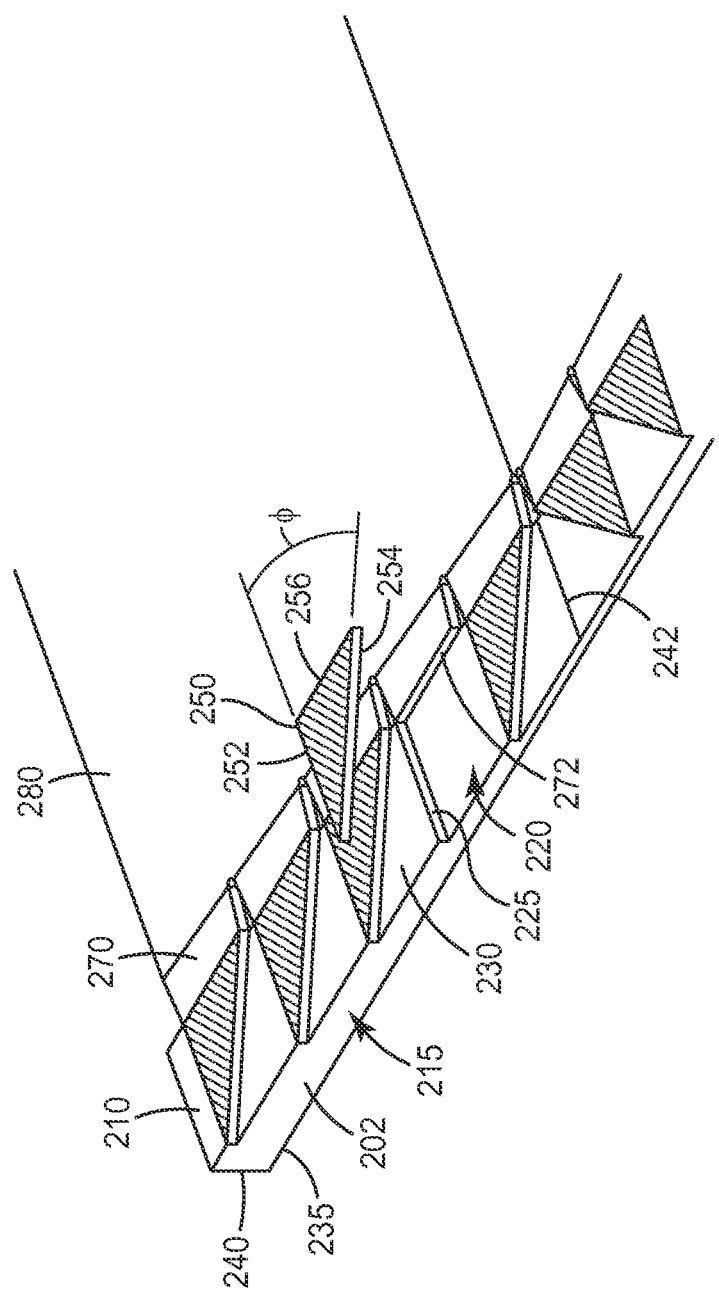
FIG. 2B shows an exploded perspective view of a lightguide.

FIG. 2B shows an exploded perspective view of a portion of the lightguide 200 of FIG. 2B, according to one aspect of the disclosure. Each of the elements 202-284 shown in FIG. 2B correspond to like-numbered elements 202-284 shown in FIG. 2A, which have been described previously. For example, first lightguide layer 202 shown in FIG. 2B corresponds to first lightguide layer 202 shown in FIG. 2A, and so on. Lightguide 200 includes a first lightguide layer 202 that includes a top surface 210, an opposing bottom surface 235, a light input side 240, an opposing end side 242, and a staircase 215. The staircase 215 includes a plurality of steps 220 that have treads 230 and risers 225 that extend along the top surface 210 from the light input side 240 to the opposing end side 242. At least one light source (not shown) can be positioned to inject light into the light input side 240 of the first lightguide layer 202, as described elsewhere.

Lightguide 200 further includes a second lightguide layer 280 which can be a planar lightguide, a tapered lightguide, a curved lightguide, and the like, as described elsewhere. A plurality of first light redirecting elements 250 are disposed on successive treads 230 of steps 220 of staircase 215 such that an input edge 252 of each light redirecting element 250 is in optical contact with each successive riser 225. Each light redirecting element 250 includes a light redirecting side 254 that makes an oblique angle φ with the respective input edge 252. The light redirecting side 254 is capable of reflecting light incident upon it, and directing the light to an output edge 256 of the light redirecting element 250. The light redirecting side 254 may include a polished surface that is capable of enabling total internal reflection (TIR) within the light redirecting element, or it may include a reflective coating disposed thereon. In some cases, the reflective coating can include a metallic coating such as silver, aluminum, and the like, or the reflective coating can include a dielectric coating such as a multilayer dielectric coating including alternating inorganic or organic dielectric layers, as known in the art. Lightguide 200 further includes a plurality of light couplers 270 having a coupler input edge 272 positioned to accept light passing through the output edge 256 of light redirecting element 250, and redirect light into second lightguide layer 280, as described elsewhere.

Following are a list of embodiments of the present disclosure.

Item 1 is a lightguide, comprising: a first lightguide layer extending along a first length of the lightguide along a first direction and comprising: a first top surface comprising a first staircase extending along the first direction and comprising a plurality of first steps forming alternating first risers and first treads; an opposite first bottom surface; and a first light input side extending between the first top and bottom surfaces, the first lightguide layer being configured to receive light from the first light input side; and a second lightguide layer extending along a second length of the lightguide along a different second direction and comprising: a second top surface; an opposite second bottom surface; and a second light input side extending between the second top and bottom surfaces and comprising a row of first light redirecting elements disposed along the second light input side, each first light redirecting element being disposed on a different corresponding first tread and optically coupled to a different corresponding first riser, the first light redirecting element being configured to redirect light exiting the corresponding first riser.

Item 2 is the lightguide of item 1, wherein the first lightguide layer is configured to receive light from the first light input side, the received light propagating within the first lightguide layer along the first direction and exiting the first lightguide layer from the first risers.

Item 3 is the lightguide of item 1 or item 2, wherein the first light redirecting element is configured to redirect light exiting the corresponding first riser, the redirected light propagating within the second lightguide layer along the second direction and exiting the lightguide from the second top surface.

Item 4 is the lightguide of item 1 to item 3, wherein the first lightguide layer is a unitary construction.

Item 5 is the lightguide of item 1 to item 4, wherein all the first risers have a same height.

Item 6 is the lightguide of item 1 to item 5, wherein at least two first risers have different heights.

Item 7 is the lightguide of item 1 to item 6, wherein a height of a first riser closer to the first light input side is smaller than a height of a first riser farther from the first light input side.

Item 8 is the lightguide of item 1 to item 7, wherein all the first risers have a same width.

Item 9 is the lightguide of item 1 to item 8, wherein at least two first risers have different widths.

Item 10 is the lightguide of item 1 to item 9, wherein each first riser has a rectangular profile.

Item 11 is the lightguide of item 1 to item 10, wherein at least one first riser is planar.

Item 12 is the lightguide of item 1 to item 11, wherein at least one first riser is configured to change a divergence of light that exits the first lightguide layer from the at least one first riser along at least one direction.

Item 13 is the lightguide of item 1 to item 12, wherein at least one first riser is configured to change a divergence of light that exits the first lightguide layer from the at least one first riser along two orthogonal directions.

Item 14 is the lightguide of item 1 to item 13, wherein at least one first riser is curved.

Item 15 is the lightguide of item 1 to item 14, wherein for each first step, the first riser is perpendicular to the first tread.

Item 16 is the lightguide of item 1 to item 15, wherein all the first treads have a same length along the first direction.

Item 17 is the lightguide of item 1 to item 16, wherein at least two first treads have different lengths along the first direction.

Item 18 is the lightguide of item 1 to item 17, wherein a length of a first tread closer to the first light input side is smaller than a length of a first tread farther from the first light input side.

Item 19 is the lightguide of item 1 to item 18, wherein a length of a first tread closer to the first light input side is greater than a length of a first tread farther from the first light input side.

Item 20 is the lightguide of item 1 to item 19, wherein all the first treads have a same width.

Item 21 is the lightguide of item 1 to item 20, wherein at least two first treads have different widths.

Item 22 is the lightguide of item 1 to item 21, wherein each first tread has a rectangular profile.

Item 23 is the lightguide of item 1 to item 22, wherein at least one first tread is planar.

Item 24 is the lightguide of item 1 to item 23, wherein at least one first tread is curved.

Item 25 is the lightguide of item 1 to item 24, wherein the first bottom surface is planar.

Item 26 is the lightguide of item 1 to item 25, wherein the first bottom surface is curved.

Item 27 is the lightguide of item 1 to item 26, wherein the first bottom surface is configured to reflect light propagating within the first lightguide layer by total internal reflection.

Item 28 is the lightguide of item 1 to item 27, wherein the first lightguide layer comprises a reflective layer disposed on the first bottom surface for reflecting light that propagates within the first lightguide layer.

Item 29 is the lightguide of item 1 to item 28, wherein the first lightguide layer comprises a reflective end opposite the first light input side.

Item 30 is the lightguide of item 1 to item 29, wherein the first lightguide layer has a first width substantially smaller than the first length, and a first thickness substantially smaller than the first width.

Item 31 is the lightguide of item 1 to item 30, wherein the first lightguide layer is substantially planar.

Item 32 is the lightguide of item 1 to item 31, wherein the first lightguide layer is curved.

Item 33 is the lightguide of item 1 to item 32, wherein the first lightguide layer is flexible.

Item 34 is the lightguide of item 1 to item 33, wherein the first lightguide layer is rigid.

Item 35 is the lightguide of item 1 to item 34, wherein the first staircase descends in a direction away from the first light input side and along at least a portion of the first length of the first lightguide layer.

Item 36 is the lightguide of item 1 to item 35, wherein the first staircase descends in a direction away from the first light input side and along the first length of the first lightguide layer.

Item 37 is the lightguide of item 1 to item 36, wherein each first light redirecting element comprises: a first light redirecting input side adjacent and optically coupled to the first riser corresponding to the light redirecting element; and a first light redirecting side making an oblique angle with the first light redirecting input side and configured to redirect light exiting the corresponding first riser and entering the first light redirecting element from the first light input side, the redirected light propagating within the second lightguide layer along the second direction and exiting the lightguide from the second top surface.

Item 38 is the lightguide of item 1 to item 37, wherein the first direction is perpendicular to the second direction.

Item 39 is the lightguide of item 1 to item 38, wherein the first direction is not perpendicular to the second direction.

Item 40 is the lightguide of item 1 to item 39, wherein the second length is greater than the first length.

Item 41 is the lightguide of item 1 to item 40, wherein a maximum width of the second lightguide layer is greater than the first length.

Item 42 is the lightguide of item 1 to item 41, wherein the second lightguide layer has a varying width.

Item 43 is the lightguide of item 1 to item 42, wherein the second lightguide layer has a substantially constant width.

Item 44 is the lightguide of item 1 to item 43, wherein a width of the second lightguide layer increases as a function of distance from the first lightguide layer.

Item 45 is the lightguide of item 1 to item 44, wherein the second lightguide layer is substantially planar.

Item 46 is the lightguide of item 1 to item 45, wherein the second lightguide layer is curved.

Item 47 is the lightguide of item 1 to item 46, wherein the second lightguide layer is flexible.

Item 48 is the lightguide of item 1 to item 47, wherein the second lightguide layer is rigid.

Item 49 is the lightguide of item 1 to item 48, wherein the second lightguide layer is a unitary construction.

Item 50 is the lightguide of item 1 to item 49, wherein the second top surface is substantially planar.

Item 51 is the lightguide of item 1 to item 50, wherein the second top surface is curved.

Item 52 is the lightguide of item 1 to item 51, wherein the second bottom surface is substantially planar.

Item 53 is the lightguide of item 1 to item 52, wherein the second bottom surface is curved.

Item 54 is the lightguide of item 1 to item 53, wherein the second lightguide layer is a wedge with a thickness of the second lightguide layer decreasing as a function of distance from the first lightguide layer.

Item 55 is the lightguide of item 1 to item 54, wherein the second lightguide layer comprises a plurality of light extracting features for extracting light that propagates within the second lightguide layer, the extracted light exiting the second lightguide layer from the second top surface.

Item 56 is the lightguide of item 55, wherein the plurality of light extracting features comprises a plurality of structures disposed on or formed in at least one of the second top and bottom surfaces.

Item 57 is the lightguide of item 55 or item 56, wherein the plurality of light extracting features comprises a plurality of particles disposed within the second lightguide layer.

Item 58 is the lightguide of item 1 to item 57, wherein each first light redirecting element is adhered to the corresponding first tread via an adhesive.

Item 59 is the lightguide of item 58, wherein an index of refraction of the adhesive is substantially less than an index of refraction of the first lightguide layer and an index of refraction of the second lightguide layer.

Item 60 is the lightguide of item 1 to item 59, wherein each first light redirecting element is optically coupled to the corresponding first riser via an adhesive.

Item 61 is the lightguide of item 1 to item 60, wherein an index of refraction of the adhesive is between an index of refraction of the first lightguide layer and an index of refraction of the second lightguide layer.

Item 62 is the lightguide of item 1 to item 61, wherein each first light redirecting element comprises a bottom face disposed on the corresponding first tread, an input face extending upwardly from the bottom face and optically coupled to the corresponding first riser, and a light redirecting face opposite the input face and extending upwardly from the bottom face, the light redirecting face being configured to redirect light exiting the corresponding first riser and entering the first light redirecting element through the input face.

Item 63 is the lightguide of item 62, wherein the light redirecting face makes an oblique angle with the input face that is in a range from 20 degrees to 70 degrees.

Item 64 is the lightguide of item 62 or item 63, wherein the light redirecting face makes an oblique angle with the input face that is in a range from 30 degrees to 60 degrees.

Item 65 is the lightguide of item 62 to item 64, wherein the light redirecting face makes an oblique angle with the input face that is in a range from 40 degrees to 50 degrees.

Item 66 is the lightguide of item 62 to item 65, wherein the light redirecting face makes a 45 degree angle with the input face.

Item 67 is the lightguide of item 62 to item 66, wherein each of the input face and the light redirecting face is perpendicular to the bottom face.

Item 68 is the lightguide of item 62 to item 67, wherein each first light redirecting element further comprises a top face opposite the bottom face and extending between the input and light redirecting faces.

Item 69 is the lightguide of claim 1, wherein a height of each light redirecting element is substantially equal to a height of the corresponding first riser.

Item 70 is the lightguide of item 1 to item 69, wherein a height of each light redirecting element is greater than a height of the corresponding first riser.

Item 71 is the lightguide of item 1 to item 70, wherein each first light redirecting element is a right angle prism.

Item 72 is the lightguide of item 71, wherein a base of the right angle prism is disposed on the corresponding first tread, a first side of the right angle prism is optically coupled to the corresponding first riser, and a hypotenuse of the right angle prism is configured to redirect light exiting the corresponding first riser and entering the right angle prism through the first side.

Item 73 is the lightguide of item 1 to item 72, wherein each of the first and second lightguide layers is a unitary construction, and wherein the second lightguide layer is adhered to the first lightguide layer via an adhesive.

Item 74 is the lightguide of item 1 to item 73, wherein an index of refraction of the first lightguide layer is different than an index of refraction of the second lightguide layer.

Item 75 is the lightguide of item 1 to item 75, wherein: the first top surface of the first lightguide layer further comprises a second staircase extending along the first direction and comprising a plurality of second steps forming alternating second risers and second treads; the first lightguide layer further comprises a second light input side opposite the first light input side and extending between the first top and bottom surfaces, the first lightguide layer being configured to receive light from the second light input side, the received light propagating within the first lightguide layer along the first direction and exiting the first lightguide layer from the second risers; and the second lightguide layer further comprises a row of second light redirecting elements disposed along the second light input side, each second light redirecting element being disposed on a different corresponding second tread and optically coupled to a different corresponding second riser, the second light redirecting element being configured to redirect light exiting the corresponding second riser, the redirected light propagating within the second lightguide layer along the second direction and exiting the lightguide from the second top surface.

Item 76 is the lightguide of item 75, wherein the first staircase descends in a direction from the first light input side toward a middle of the first lightguide layer, and the second staircase descends in an opposing direction from the second light input side toward the middle of the first lightguide layer.

Item 77 is the lightguide of item 75 or item 76, wherein the second lightguide layer is configured to receive light from the second light input side, the received light propagating within the second lightguide layer along the second direction and exiting the second lightguide layer from the second risers.

Item 78 is the lightguide of item 75 to item 77, wherein the second light redirecting element is configured to redirect light exiting the corresponding second riser, the redirected light propagating within the second lightguide layer along the second direction and exiting the lightguide from the second top surface.

Item 79 is the lightguide of item 75 to item 78, wherein the second lightguide layer is a unitary construction.

Item 80 is the lightguide of item 75 to item 79, wherein all the second risers have a same height.

Item 81 is the lightguide of item 75 to item 80, wherein at least two second risers have different heights.

Item 82 is the lightguide of item 75 to item 81, wherein a height of a second riser closer to the second light input side is smaller than a height of a second riser farther from the second light input side.

Item 83 is the lightguide of item 75 to item 82, wherein all the second risers have a same width.

Item 84 is the lightguide of item 75 to item 83, wherein at least two second risers have different widths.

Item 85 is the lightguide of item 75 to item 84, wherein each second riser has a rectangular profile.

Item 86 is the lightguide of item 75 to item 85, wherein at least one second riser is planar.

Item 87 is the lightguide of item 75 to item 86, wherein at least one second riser is configured to change a divergence of light that exits the second lightguide layer from the at least one second riser along at least one direction.

Item 88 is the lightguide of item 75 to item 87, wherein at least one second riser is configured to change a divergence of light that exits the second lightguide layer from the at least one second riser along two orthogonal directions.

Item 89 is the lightguide of item 75 to item 88, wherein at least one second riser is curved.

Item 90 is the lightguide of item 75 to item 89, wherein for each second step, the second riser is perpendicular to the second tread.

Item 91 is the lightguide of item 75 to item 90, wherein all the second treads have a same length along the second direction.

Item 92 is the lightguide of item 75 to item 91, wherein at least two second treads have different lengths along the second direction.

Item 93 is the lightguide of item 75 to item 92, wherein a length of a second tread closer to the second light input side is smaller than a length of a second tread farther from the second light input side.

Item 94 is the lightguide of item 75 to item 93, wherein a length of a second tread closer to the second light input side is greater than a length of a second tread farther from the second light input side.

Item 95 is the lightguide of item 75 to item 94, wherein all the second treads have a same width.

Item 96 is the lightguide of item 75 to item 95, wherein at least two second treads have different widths.

Item 97 is the lightguide of item 75 to item 96, wherein each second tread has a rectangular profile.

Item 98 is the lightguide of item 75 to item 97, wherein at least one second tread is planar.

Item 99 is the lightguide of item 75 to item 98, wherein at least one second tread is curved.

Item 100 is the lightguide of item 75 to item 99, wherein the second bottom surface is planar.

Item 101 is the lightguide of item 75 to item 100, wherein the second bottom surface is curved.

Item 102 is the lightguide of item 75 to item 101, wherein the second bottom surface is configured to reflect light propagating within the second lightguide layer by total internal reflection.

Item 103 is the lightguide of item 75 to item 102, wherein the second lightguide layer comprises a reflective layer disposed on the second bottom surface for reflecting light that propagates within the second lightguide layer.

Item 104 is the lightguide of item 75 to item 103, wherein the second lightguide layer comprises a reflective end opposite the second light input side.

Item 105 is the lightguide of item 75 to item 104, wherein the second lightguide layer has a second width substantially smaller than the second length, and a second thickness substantially smaller than the second width.

Item 106 is the lightguide of item 75 to item 105, wherein the second lightguide layer is substantially planar.

Item 107 is the lightguide of item 75 to item 106, wherein the second lightguide layer is curved.

Item 108 is the lightguide of item 75 to item 107, wherein the second lightguide layer is flexible.

Item 109 is the lightguide of item 75 to item 108, wherein the second lightguide layer is rigid.

Item 110 is the lightguide of item 75 to item 109, wherein the second staircase descends in a direction away from the second light input side and along at least a portion of the second length of the second lightguide layer.

Item 111 is the lightguide of item 75 to item 110, wherein the second staircase descends in a direction away from the second light input side and along the second length of the second lightguide layer.

Item 112 is the lightguide of item 75 to item 111, wherein each second light redirecting element comprises: a second light input side adjacent and optically coupled to the second riser corresponding to the light redirecting element; and a second light redirecting side making an oblique angle with the second light input side and configured to redirect light exiting the corresponding second riser and entering the second light redirecting element from the second light input side, the redirected light propagating within the second lightguide layer along the second direction and exiting the lightguide from the second top surface.

Item 113 is the lightguide of item 75 to item 112, wherein the first direction is perpendicular to the second direction.

Item 114 is the lightguide of item 75 to item 113, wherein the first direction is not perpendicular to the second direction.

Item 115 is the lightguide of item 75 to item 114, wherein each second light redirecting element is adhered to the corresponding second tread via an adhesive.

Item 116 is the lightguide of item 115, wherein an index of refraction of the adhesive is substantially less than an index of refraction of the first lightguide layer and an index of refraction of the second lightguide layer.

Item 117 is the lightguide of item 75 to item 116, wherein each second light redirecting element is optically coupled to the corresponding second riser via an adhesive.

Item 118 is the lightguide of item 117, wherein an index of refraction of the adhesive is between an index of refraction of the first lightguide layer and an index of refraction of the second lightguide layer.

Item 119 is the lightguide of item 75 to item 118, wherein each second light redirecting element comprises a bottom face disposed on the corresponding second tread, an input face extending upwardly from the bottom face and optically coupled to the corresponding second riser, and a light redirecting face opposite the input face and extending upwardly from the bottom face, the light redirecting face being configured to redirect light exiting the corresponding second riser and entering the second light redirecting element through the input face.

Item 120 is the lightguide of item 119, wherein the light redirecting face makes an oblique angle with the input face that is in a range from 20 degrees to 70 degrees.

Item 121 is the lightguide of item 119 or item 120, wherein the light redirecting face makes an oblique angle with the input face that is in a range from 30 degrees to 60 degrees.

Item 122 is the lightguide of item 119 to item 121, wherein the light redirecting face makes an oblique angle with the input face that is in a range from 40 degrees to 50 degrees.

Item 123 is the lightguide of item 119 to item 122, wherein the light redirecting face makes a 45 degree angle with the input face.

Item 124 is the lightguide of item 119 to item 123, wherein each of the input face and the light redirecting face is perpendicular to the bottom face.

Item 125 is the lightguide of item 119 to item 124, wherein each second light redirecting element further comprises a top face opposite the bottom face and extending between the input and light redirecting faces.

Item 126 is the lightguide of item 75 to item 125, wherein a height of each light redirecting element is substantially equal to a height of the corresponding second riser.

Item 127 is the lightguide of item 75 to item 126, wherein a height of each light redirecting element is greater than a height of the corresponding second riser.

Item 128 is the lightguide of item 75 to item 127, wherein each second light redirecting element is a right angle prism.

Item 129 is the lightguide of item 128, wherein a base of the right angle prism is disposed on the corresponding second tread, a second side of the right angle prism is optically coupled to the corresponding second riser, and a hypotenuse of the right angle prism is configured to redirect light exiting the corresponding second riser and entering the right angle prism through the second side.

Item 130 is the lightguide of item 75 to item 129, wherein each of the first and second lightguide layers is a unitary construction, and wherein the second lightguide layer is adhered to the first lightguide layer via an adhesive.

Item 131 is the lightguide of item 75 to item 130, wherein an index of refraction of the first lightguide layer is different than an index of refraction of the second lightguide layer.

Item 132 is a lightguide, comprising: a first unitary lightguide layer comprising opposing first and second sides and a staircase extending from the first side toward the second side, the staircase comprising alternating risers and treads; and a second unitary lightguide layer comprising opposing first and second sides and a plurality of light redirecting elements disposed along the first side of the second unitary lightguide layer, each light redirecting element being optically coupled to a different corresponding riser, such that light that enters the first unitary lightguide layer from the first side of the first unitary lightguide layer travels within the first unitary lightguide layer toward the second side of the first unitary lightguide layer, exits the first unitary lightguide layer from the riser, is redirected by the light redirecting element, and the redirected light travels within the second unitary lightguide layer toward the second side of the second unitary lightguide layer, and exits the lightguide from an emission side of the second unitary lightguide layer.

Item 133 is a lightguide, comprising: a first elongated lightguide layer extending along a first length of the lightguide along a first direction and comprising: a first light input side; and a first top surface comprising a first staircase descending away from the first light input side along the first direction and comprising a plurality of first steps forming alternating first risers and first treads, the first elongated lightguide layer being configured to receive light from the first light input side, the received light propagating within the first elongated lightguide layer along the first direction and exiting the first elongated lightguide layer from the first risers; a planar second lightguide layer extending along a second length of the lightguide along a different second direction and comprising: a second top surface; and a second light input side; and a coupler comprising a row of first light redirecting elements, each first light redirecting element being disposed on a different corresponding first tread, optically coupled to a different corresponding first riser and optically coupled to the second light input side, the first light redirecting element being configured to redirect light exiting the corresponding first riser, the redirected light entering the planar second lightguide layer through the second light input side and propagating within the planar second lightguide layer along the second direction and exiting the lightguide from the second top surface.

Item 134 is the lightguide of item 133, wherein the first elongated lightguide layer is configured to receive light from the first light input side, the received light propagating within the first elongated lightguide layer along the first direction and exiting the first elongated lightguide layer from the first risers.

Item 135 is the lightguide of item 133 or item 134, wherein the first light redirecting element is configured to redirect light exiting the corresponding first riser, the redirected light propagating within the planar second lightguide layer along the second direction and exiting the lightguide from the second top surface.

Item 136 is the lightguide of item 133 to item 135, wherein the first elongated lightguide layer is a unitary construction.

Item 137 is the lightguide of item 133 to item 136, wherein all the first risers have a same height.

Item 138 is the lightguide of item 133 to item 137, wherein at least two first risers have different heights.

Item 139 is the lightguide of item 133 to item 138, wherein a height of a first riser closer to the first light input side is smaller than a height of a first riser farther from the first light input side.

Item 140 is the lightguide of item 133 to item 139, wherein all the first risers have a same width.

Item 141 is the lightguide of item 133 to item 140, wherein at least two first risers have different widths.

Item 142 is the lightguide of item 133 to item 141, wherein each first riser has a rectangular profile.

Item 143 is the lightguide of item 133 to item 142, wherein at least one first riser is planar.

Item 144 is the lightguide of item 133 to item 143, wherein at least one first riser is configured to change a divergence of light that exits the first elongated lightguide layer from the at least one first riser along at least one direction.

Item 145 is the lightguide of item 133 to item 144, wherein at least one first riser is configured to change a divergence of light that exits the first elongated lightguide layer from the at least one first riser along two orthogonal directions.

Item 146 is the lightguide of item 133 to item 145, wherein at least one first riser is curved.

Item 147 is the lightguide of item 133 to item 146, wherein for each first step, the first riser is perpendicular to the first tread.

Item 148 is the lightguide of item 133 to item 147, wherein all the first treads have a same length along the first direction.

Item 149 is the lightguide of item 133 to item 148, wherein at least two first treads have different lengths along the first direction.

Item 150 is the lightguide of item 133 to item 149, wherein a length of a first tread closer to the first light input side is smaller than a length of a first tread farther from the first light input side.

Item 151 is the lightguide of item 133 to item 150, wherein a length of a first tread closer to the first light input side is greater than a length of a first tread farther from the first light input side.

Item 152 is the lightguide of item 133 to item 151, wherein all the first treads have a same width.

Item 153 is the lightguide of item 133 to item 152, wherein at least two first treads have different widths.

Item 154 is the lightguide of item 133 to item 153, wherein each first tread has a rectangular profile.

Item 155 is the lightguide of item 133 to item 154, wherein at least one first tread is planar.

Item 156 is the lightguide of item 133 to item 155, wherein at least one first tread is curved.

Item 157 is the lightguide of item 133 to item 156, wherein the first bottom surface is planar.

Item 158 is the lightguide of item 133 to item 157, wherein the first bottom surface is curved.

Item 159 is the lightguide of item 133 to item 158, wherein the first bottom surface is configured to reflect light propagating within the first elongated lightguide layer by total internal reflection.

Item 160 is the lightguide of item 133 to item 159, wherein the first elongated lightguide layer comprises a reflective layer disposed on the first bottom surface for reflecting light that propagates within the first elongated lightguide layer.

Item 161 is the lightguide of item 133 to item 160, wherein the first elongated lightguide layer comprises a reflective end opposite the first light input side.

Item 162 is the lightguide of item 133 to item 161, wherein the first elongated lightguide layer has a first width substantially smaller than the first length, and a first thickness substantially smaller than the first width.

Item 163 is the lightguide of item 133 to item 162, wherein the first elongated lightguide layer is substantially planar.

Item 164 is the lightguide of item 133 to item 163, wherein the first elongated lightguide layer is curved.

Item 165 is the lightguide of item 133 to item 164, wherein the first elongated lightguide layer is flexible.

Item 166 is the lightguide of item 133 to item 165, wherein the first elongated lightguide layer is rigid.

Item 167 is the lightguide of item 133 to item 166, wherein the first staircase descends in a direction away from the first light input side and along at least a portion of the first length of the first elongated lightguide layer.

Item 168 is the lightguide of item 133 to item 167, wherein the first staircase descends in a direction away from the first light input side and along the first length of the first elongated lightguide layer.

Item 169 is the lightguide of item 133 to item 168, wherein each first light redirecting element comprises: a first light redirecting input side adjacent and optically coupled to the first riser corresponding to the light redirecting element; and a first light redirecting side making an oblique angle with the first light redirecting input side and configured to redirect light exiting the corresponding first riser and entering the first light redirecting element from the first light redirecting input side, the redirected light propagating within the planar second lightguide layer along the second direction and exiting the lightguide from the second top surface.

Item 170 is the lightguide of item 133 to item 169, wherein the first direction is perpendicular to the second direction.

Item 171 is the lightguide of item 133 to item 170, wherein the first direction is not perpendicular to the second direction.

Item 172 is the lightguide of item 133 to item 171, wherein the second length is greater than the first length.

Item 173 is the lightguide of item 133 to item 172, wherein a maximum width of the planar second lightguide layer is greater than the first length.

Item 174 is the lightguide of item 133 to item 173, wherein the planar second lightguide layer has a varying width.

Item 175 is the lightguide of item 133 to item 174, wherein the planar second lightguide layer has a substantially constant width.

Item 176 is the lightguide of item 133 to item 175, wherein a width of the planar second lightguide layer increases as a function of distance from the first elongated lightguide layer.

Item 177 is the lightguide of item 133 to item 176, wherein the planar second lightguide layer is substantially planar.

Item 178 is the lightguide of item 133 to item 177, wherein the planar second lightguide layer is curved.

Item 179 is the lightguide of item 133 to item 178, wherein the planar second lightguide layer is flexible.

Item 180 is the lightguide of item 133 to item 179, wherein the planar second lightguide layer is rigid.

Item 181 is the lightguide of item 133 to item 180, wherein the planar second lightguide layer is a unitary construction.

Item 182 is the lightguide of item 133 to item 181, wherein the second top surface is substantially planar.

Item 183 is the lightguide of item 133 to item 182, wherein the second top surface is curved.

Item 184 is the lightguide of item 133 to item 183, wherein the second bottom surface is substantially planar.

Item 185 is the lightguide of item 133 to item 184, wherein the second bottom surface is curved.

Item 186 is the lightguide of item 133 to item 185, wherein the planar second lightguide layer is a wedge with a thickness of the planar second lightguide layer decreasing as a function of distance from the first elongated lightguide layer.

Item 187 is the lightguide of item 133 to item 186, wherein the planar second lightguide layer comprises a plurality of light extracting features for extracting light that propagates within the planar second lightguide layer, the extracted light exiting the planar second lightguide layer from the second top surface.

Item 188 is the lightguide of item 187, wherein the plurality of light extracting features comprises a plurality of structures disposed on or formed in at least one of the second top and bottom surfaces.

Item 189 is the lightguide of item 187 or item 188, wherein the plurality of light extracting features comprises a plurality of particles disposed within the planar second lightguide layer.

Item 190 is the lightguide of item 133 to item 189, wherein each first light redirecting element is adhered to the corresponding first tread via an adhesive.

Item 191 is the lightguide of item 190, wherein an index of refraction of the adhesive is substantially less than an index of refraction of the first elongated lightguide layer and an index of refraction of the planar second lightguide layer.

Item 192 is the lightguide of item 133 to item 191, wherein each first light redirecting element is optically coupled to the corresponding first riser via an adhesive.

Item 193 is the lightguide of item 192, wherein an index of refraction of the adhesive is between an index of refraction of the first elongated lightguide layer and an index of refraction of the planar second lightguide layer.

Item 194 is the lightguide of item 133 to item 193, wherein each first light redirecting element comprises a bottom face disposed on the corresponding first tread, an input face extending upwardly from the bottom face and optically coupled to the corresponding first riser, and a light redirecting face opposite the input face and extending upwardly from the bottom face, the light redirecting face being configured to redirect light exiting the corresponding first riser and entering the first light redirecting element through the input face.

Item 195 is the lightguide of item 194, wherein the light redirecting face makes an oblique angle with the input face that is in a range from 20 degrees to 70 degrees.

Item 196 is the lightguide of item 194 or item 195, wherein the light redirecting face makes an oblique angle with the input face that is in a range from 30 degrees to 60 degrees.

Item 197 is the lightguide of item 194 to item 196, wherein the light redirecting face makes an oblique angle with the input face that is in a range from 40 degrees to 50 degrees.

Item 198 is the lightguide of item 194 to item 197, wherein the light redirecting face makes a 45 degree angle with the input face.

Item 199 is the lightguide of item 194 to item 198, wherein each of the input face and the light redirecting face is perpendicular to the bottom face.

Item 200 is the lightguide of item 194 to item 199, wherein each first light redirecting element further comprises a top face opposite the bottom face and extending between the input and light redirecting faces.

Item 201 is the lightguide of item 133 to item 200, wherein a height of each light redirecting element is substantially equal to a height of the corresponding first riser.

Item 202 is the lightguide of item 133 to item 201, wherein a height of each light redirecting element is greater than a height of the corresponding first riser.

Item 203 is the lightguide of item 133 to item 202, wherein each first light redirecting element is a right angle prism.

Item 204 is the lightguide of item 203, wherein a base of the right angle prism is disposed on the corresponding first tread, a first side of the right angle prism is optically coupled to the corresponding first riser, and a hypotenuse of the right angle prism is configured to redirect light exiting the corresponding first riser and entering the right angle prism through the first side.

Item 205 is the lightguide of item 133 to item 204, wherein each of the first elongated and planar second lightguide layers is a unitary construction, and wherein the planar second lightguide layer is adhered to the first elongated lightguide layer via a second adhesive.

Item 206 is the lightguide of item 133 to item 205, wherein an index of refraction of the first elongated lightguide layer is different than an index of refraction of the planar second lightguide layer.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A lightguide, comprising:
a first lightguide layer extending along a first length of the lightguide along a first direction and comprising:
a first top surface comprising (1) a first staircase extending along the first direction and comprising a plurality of first steps forming alternating first risers and first treads, and (2) a second staircase extending along the first direction and comprising a plurality of second steps forming alternating second risers and second treads;
an opposite first bottom surface;
a first light input side extending between the first top and bottom surfaces, the first lightguide layer being configured to receive light from the first light input side; and
a second light input side opposite the first light input side and extending between the first top and bottom surfaces,
the first lightguide layer being configured to receive light from the second light input side, the received light propagating within the first lightguide layer along the first direction and exiting the first lightguide layer from the second risers; and
a second lightguide layer extending along a second length of the lightguide along a different second direction and comprising:
a second top surface;
an opposite second bottom surface; and
a second light input side extending between the second top and bottom surfaces and comprising (1) a row of first light redirecting elements disposed along the second light input side, each first light redirecting element being disposed on a different corresponding first tread and optically coupled to a different corresponding first riser, the first light redirecting element being configured to redirect light exiting the corresponding first riser; and (2) a row of second light redirecting elements disposed along the second light input side, each second light redirecting element being disposed on a different corresponding second tread and optically coupled to a different corresponding second riser, the second light redirecting element being configured to redirect light exiting the corresponding second riser,
the redirected light propagating within the second lightguide layer along the second direction and exiting the lightguide from the second top surface.

2. The lightguide of claim 1, wherein the first staircase descends in a direction from the first light input side toward a middle of the first lightguide layer, and the second staircase descends in an opposing direction from the second light input side toward the middle of the first lightguide layer.

3. The lightguide of claim 1, wherein the second lightguide layer is configured to receive light from the second light input side, the received light propagating within the second lightguide layer along the second direction and exiting the second lightguide layer from the second risers.

4. The lightguide of claim 1, wherein the second light redirecting element is configured to redirect light exiting the corresponding second riser, the redirected light propagating within the second lightguide layer along the second direction and exiting the lightguide from the second top surface.

5. The lightguide of claim 1, wherein each second light redirecting element comprises:
- a second light input side adjacent and optically coupled to the second riser corresponding to the light redirecting element; and
- a second light redirecting side making an oblique angle with the second light input side and configured to redirect light exiting the corresponding second riser and entering the second light redirecting element from the second light input side, the redirected light propagating within the second lightguide layer along the second direction and exiting the lightguide from the second top surface.

6. The lightguide of claim 1, wherein each second light redirecting element comprises a bottom face disposed on the corresponding second tread, an input face extending upwardly from the bottom face and optically coupled to the corresponding second riser, and a light redirecting face opposite the input face and extending upwardly from the bottom face, the light redirecting face being configured to redirect light exiting the corresponding second riser and entering the second light redirecting element through the input face.

* * * * *